United States Patent [19]

Sterki et al.

[11] 4,228,591
[45] Oct. 21, 1980

[54] MEASUREMENT SENSING DEVICES

[75] Inventors: Armin Sterki, Thalwil; Gerd Sommer, Dietikon, both of Switzerland

[73] Assignee: Maag Gear Wheel & Machine Co. Ltd., Zurich, Switzerland

[21] Appl. No.: 12,724

[22] Filed: Feb. 16, 1979

Related U.S. Application Data

[63] Continuation of Ser. No. 765,191, Feb. 3, 1977, abandoned.

[30] Foreign Application Priority Data

Feb. 12, 1976 [CH] Switzerland ............................ 1742/76

[51] Int. Cl.³ .......................... G01B 7/28; G01B 7/34
[52] U.S. Cl. .................................. 33/174 L; 33/149 J; 33/174 P
[58] Field of Search .............. 33/174 L, 149 R, 149 J, 33/172 E, 169 R, DIG. 5, 174 P, 179.5 R

[56] References Cited

U.S. PATENT DOCUMENTS 3,987,551  10/1976  Kienle ................................. 33/174 L Primary Examiner—Willis Little
Attorney, Agent, or Firm—Toren, McGeady and Stanger

[57] ABSTRACT

A measurement sensing device has a probe element that is displaced by an object to be measured and is acted on by an electric motor when in its displaced position to control the pressure with which it bears on the object. A control circuit for varying the standstill torque of the motor comprises means for compensating for variations in any biasing force applied to the probe element by its mounting, means for compensating for weight effects acting in the direction of measurement, and means for adjusting the predetermined value of the bearing pressure.

11 Claims, 4 Drawing Figures

MEASUREMENT SENSING DEVICES

This is a continuation of Application Ser. No. 765,191 filed on Feb. 3, 1977, now abandoned.

BACKGROUND OF THE INVENTION

The invention relates to a sensing device for length or position measurements, which has a means of presetting the bearing pressure of the sensing element in respect of amount and direction.

A sensing device of this kind is shown for example in the German Utility Model No. 1 920 551, in which both the value of the bearing pressure, that is to say its magnitude, and the direction of the bearing pressure can be adjusted according to a scale by moving a handle.

In addition, a tooth flank sensing device is disclosed in U.S. Pat. No. 3,943,633, in which the pressure and direction of pressure of the sensor can be adjusted, in accordance with a scale, on a ring which is constructed in the form of a sleeve around the cylindrical main body of the sensing device.

Furthermore, U.S. Pat. No. 3,936,946 discloses a sensing device for pitch measurement on gears in which for the purpose of reversing the direction of application of the sensor, control is effected either by a rotatable rotor acting on an eccentric pin or by means of a magnet, whereby the direction of sensing is reversed. In this sensing device the magnitude of the value of the sensing pressure is determined by means of adjustable spring deflection stops.

These devices do not suffice, however, when it is required that the sensing contact pressure should be adjustable very accurately and easily, and above all in a readily accessible manner, in respect of amount and direction and irrespective of the position of the device in space.

SUMMARY OF THE INVENTION

According to the present invention there is provided a sensing device in which the measuring pressure of the sensing element is produced by means of the torque of an electric motor which is arrested in a determined position of the sensing element. This has the consequence that the bearing pressure can be predetermined in respect of magnitude and direction and also weight compensation in the event of a change of position can be achieved, by electronic control of the motor operation, so that the device can be arranged for use in high precision measurements.

As a further advantage a sensing device according to the invention can be arranged to produce only a substantially negligible and constant amount of heat, so that a constant temperature is maintained in the device.

BRIEF DESCRIPTION OF THE DRAWINGS

The invention is illustrated diagrammatically and by way of non-limitative example in the accompanying drawings, in which.

DESCRIPTION OF THE PREFERRED EMBODIMENT

Figure 1:
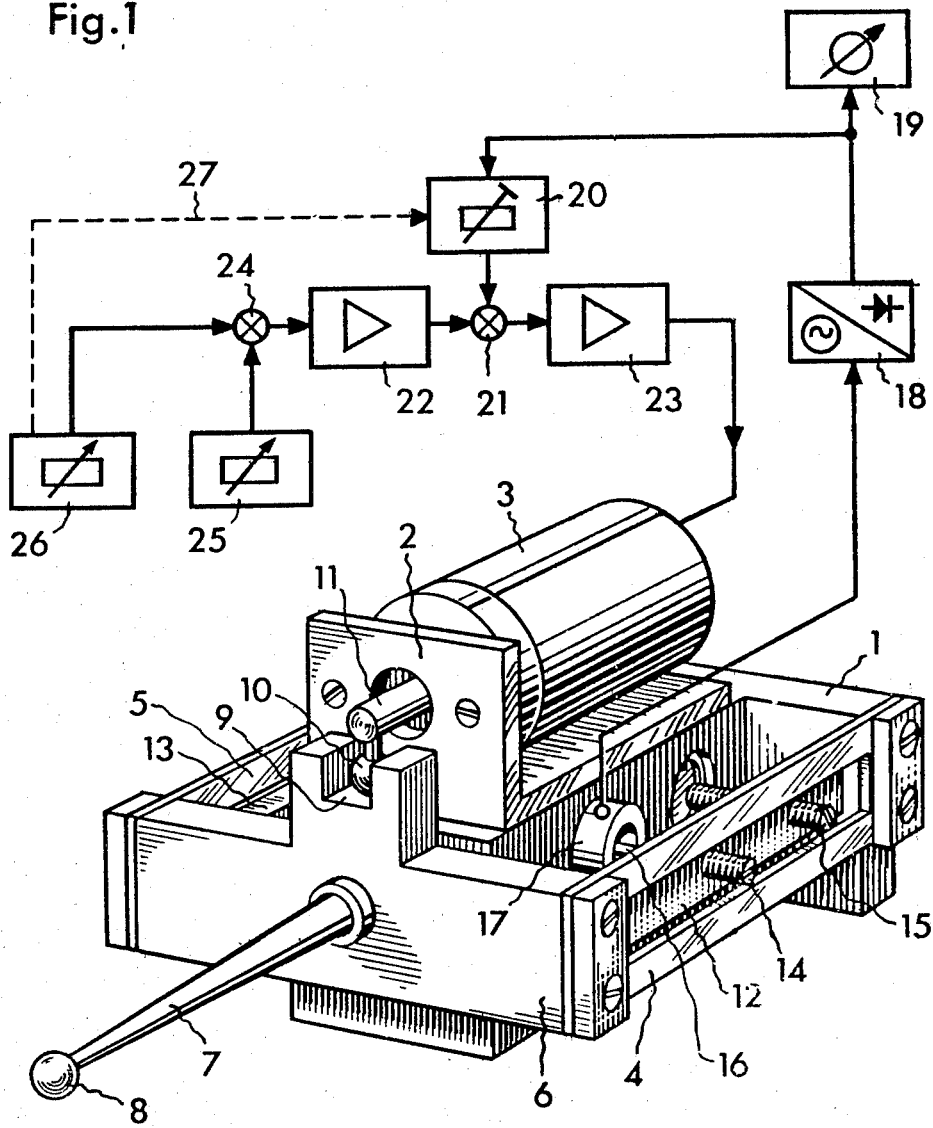
FIG. 1 is a perspective representation of a sensing device according to the invention, together with a block diagram of a controlling circuit in simplified form.

The sensing device according to the invention, as shown in perspective in FIG. 1, comprises a base plate 1 on which is fastened an angle plate 2 carrying an electric motor 3 in the form of a permanent magnet direct current motor. Two pairs of leaf springs 4 and 5 are fastened at one end to the base plate 1 and at the other end to a carrier 6, these two pairs of springs 4 and 5 forming a parallelogram mounting for the measurement movement of the carrier 6. On the carrier 6 is mounted a sensing probe or feeler 7 having a ball-shaped sensor 8. In addition, the carrier 6 is provided with a recess 9 engaged by a ball 10 fastened eccentrically on output shaft 11 of the motor 3. To each side of the base plate 1 a bar, 12 and 13 respectively, is fastened on the carrier 6, adjusting screws 14 and 15 respectively being inserted in these bars. The adjusting screw 14 carries an armature 16 of a measurement transducer 17, while the adjusting screw 15 serves as a stop or path limiter for the carrier 6 in that direction. The corresponding adjusting screw (not visible in the drawing) in the bar 13 serves the same purpose for the opposite direction of movement of the probe.

A measurement transducer electronic unit 18, which has its output connected to a displacement signal indicator instrument 19, is connected to the measurement transducer 17. In addition, this measurement transducer electronic unit is connected to a compensation circuit 20 for the parallelogram mounting. The compensation circuit 20 is not shown in detail but comprises an adjustable voltage divider and a triggerable signal inverter. The compensation circuit 20 is connected by way of a summator 21 to an amplifier 23, which is combined with a driver acting on the motor 3, the summator 21 also connecting to the amplifier 23 a further amplifier 22 connected by a summator 24 to a potentiometer 25 for setting a weight compensation correction and to a potentiometer 26 for setting a prestressing force value. The compensation circuit 20 and the potentiometer 26 are connected together through a control line 27. The control signal is used to invert the compensating signal of compensating circuit 20. The electronic units 17 to 26 are units which are known per se and are commercially available, or they can be produced in a simple manner with the aid of known electronic components.

On the deflection of the sensor 8 in the use of the apparatus measurement transducer 17 is operated by way of the sensing feeler 7, the carrier 6, the bar 12, the adjusting screw 14, and the measuring armature 16. At the same time the rotor of the motor 3 is also turned through the ball 10 and the shaft 11, the motor 3 however being arrested at a determined position of the sensor.

Thus, on the deflection of the sensor 8 by an object which is to be measured, for example one flank of a gear tooth 28, the measurement transducer 17 supplies a displacement signal which is proportional to the magnitude of the deflection and which is converted in the measurement transducer electronic unit 18 into a direct current displacement signal. The polarity of the direct current signal corresponds to the direction of deflection, and its voltage corresponds to the amount or magnitude of the deflection, as indicated by the displacement signal indicator instrument 19.

Figure 2:
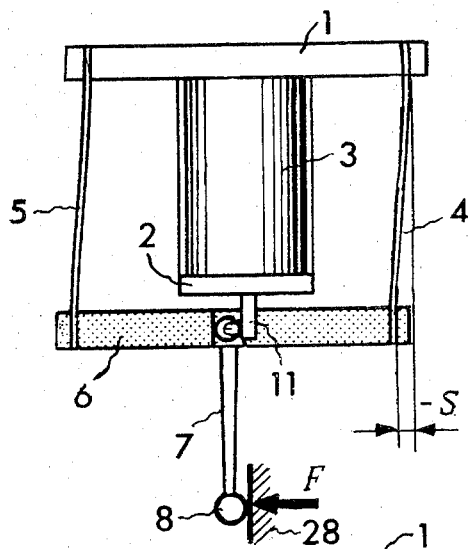
FIG. 2 shows diagrammatically the force and the corresponding displacement in a view from above, when acting on a left-hand tooth flank or other surface.
Figure 3:
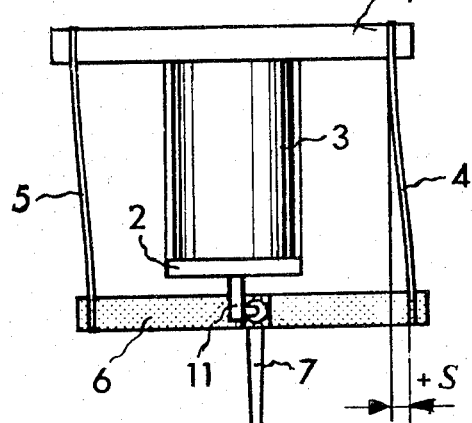
FIG. 3 is a similar view to FIG. 2 in the case of a right-hand flank or other surface.

Through the increasing magnitude of the deflection the restoring force F of the leaf springs 4 and 5 of the parallelogram mounting also increases (FIGS. 2 and 3). The direct current displacement signal is however now transmitted through the compensation circuit 20 for the parallelogram mounting to the summator 21 in accordance with the amount or magnitude and the sign for the direction of deflection±S (FIGS. 2 and 3). Consequently the amplifier 23 acting at the same time as driver varies the motor current of the motor 3 and consequently the torque of the motor in dependence on the deflection. Since this torque acts through the motor shaft 11 and the ball 10 to exert a force on the carrier 6, the increasing restoring forces of the leaf springs 4 and 5 are compensated and the pressure by which the sensor 8 bears on the object 28 to be measured is kept approximately constant. This pressure F is thus dependent of the magnitude of the deflection or of the magnitude of the error or defect of the object to be measured, that is to say in the given example the left-hand or right-hand flank of the tooth 28. Depending on the type of measurement selected, determined by the setting of potentiometer 26, either the left-hand or the right-hand tooth flank, a corresponding control signal is fed into the parallelogram mounting compensation circuit 20 to change the polarity of the compensating signal depending on the selected measurement. The adjustment of the compensation is dependent on the stiffness of the leaf springs 4 and 5, and is thus an adjustment requiring to be made only once.

The torque of the electric motor 3 is thus adjusted electronically in respect of magnitude and direction, and the variation of contact pressure of the sensor 8, caused by the spring system comprising the springs 4 and 5 in particular of the parallelogram mounting, is electronically compensated in dependence on and to the extent of the deflection to produce the contact pressure that is in dependent of the magnitude of the deflection.

Figure 4:
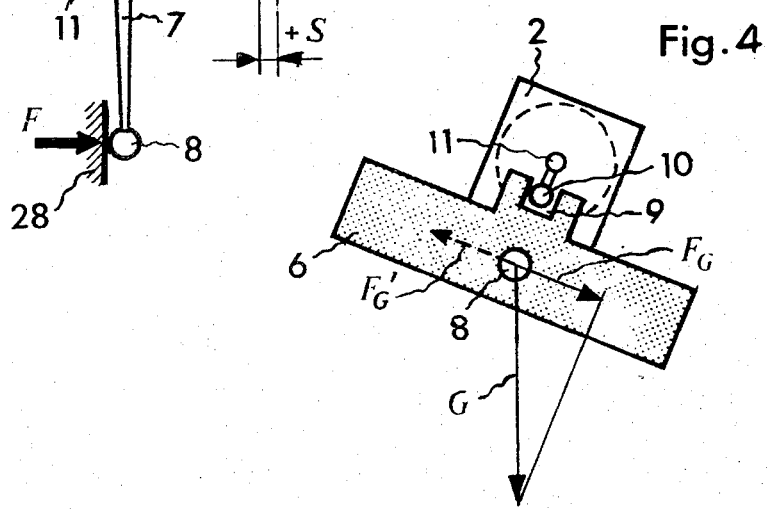
FIG. 4 is a diagrammatic front view of the device with the corresponding forces for an assumed arbitrary position in space.

If the movements of the sensing device are out of the horizontal, the weight G of the movable parts produces, with respect to the measurement surface, a force component $F_G$ (FIG. 4) which has to be added or deducted. This force $F_G$ can be compensated by an oppositely directed force $F_G'$ through the weight compensation potentiometer 25 by presetting a fixed reference value dependent on the orientation of the sensing device. This can be adjusted very simply on the potentiometer 25 for a determined inclined position or even for a vertical position by setting the displacement indication on the instrument 19 to zero by adjustment of the potentiometer 25 while the sensor 8 is freely suspended, so that the sensing device is then in equilibrium without any contact pressure on the probe. With the set value of the prestressing force adjusted to zero, only the set value of the weight compensation then acts through the summators 24 and 21.

In use the set value of the prestressing force is added in the summator 24, with the correct sign, to the set value of the weight compensation and is amplified in the amplifier 22. In the summator 21 the signal is added, with the correct sign, to the value of the parallelogram mounting compensation and the amplifier 23 with the driver is operated and in turn transmits the motor current for producing the torque or prestressing force on the ball 10 and thus on the sensor 8. The bearing pressure of the sensor 8 is thus kept practically constant irrespective of the position of the device in space.

In computer controlled automated measuring systems the potentiometers 25 and 26 can be replaced by digital/analogue converters in a manner known per se. The prestressing and weight compensation values are then preset by the computer.

What is claimed is:

1. A device for length or position measurements comprising a sensor element, a mounting for movably supporting said element means coupled to said mounting for sensing the displacement of said element, an electric motor coupled to said mounting for operating on said element to control the bearing pressure of said sensor element on an object to be measured, control means acting on said motor for arresting the motor at a predetermined position of the sensor while causing the motor to develop a torque that is operative on the sensor for said bearing pressure control, said electric motor operating on the element for maintaining continuous displacement of said sensor of the element with the object in response to the contact sensed by the sensing means after contact of the element with the object has been established.

2. A device for length or position measurement having a sensor element for bearing engagement with an object to be measured, a resilient mounting on which said element is supported, said mounting comprising a spring system of parallelogram configuration, displacement means coupled to said mounting for displacing the element with resilient deformation of said mounting in either of two opposite positions selectively from a rest position of the mounting to apply to said element against the object to be measured, said displacement means including electromagnetic drive means adapted to apply a force to said element in either of said directions, a measurement transducer connected to the mounting and generating an electrical output signal dependent upon displacement of the mounting spring system, electronic control means connected to said electromagnetic drive means and to said measurement transducer for acting on said drive means in dependence upon said transducer output signal, said control means causing operation of said electromagnetic drive means to exert a mechanical force in the selected direction in dependence upon said transducer output signal so as to maintain the bearing pressure of the sensor element on the object to be measured substantially constant and independent of the magnitude and direction of displacement of said resilient mounting.

3. A device according to claim 2 wherein the electric motor is a permanent magnet direct current motor.

4. A device according to claim 2 wherein said control means are in the form of an electronic control circuit adjusting the torque of the electric motor both in respect of its magnitude and its direction.

5. A device according to claim 2 wherein said control means comprise means for compensating for gravity effects on the bearing pressure of the sensor element whereby the bearing pressure is substantially independent of the direction of displacement of the sensor element with respect to the horizontal.

6. A device according to claim 2 wherein said control means comprise adjustment means for said motor output to produce an adjustably predetermined pressure force of the sensor element on the object to be measured.

7. A device for length or position measurements comprising a sensor element for engagement with an object to be measured, a mounting for said element permitting displacements of the element, and means for producing contact between said element and the object and maintaining contact continuously as well as for sensing displacement of said element relative to the mounting in response to the contact and for controlling the bearing pressure of said element on the object, said means comprising an electric motor on said mounting for acting on said element and control means for varying the torque developed by said motor as well as transducer means on said mounting for sensing displacement of the element relative to the mounting, said control means serving for arresting the motor at a position of the sensor determined by the measurement to be performed on said object while causing the motor to develop a torque that controls the pressure of the sensor element on said object.

8. A device for use in length or position measurements comprising a sensor element, a resilient mounting for said element, said mounting exerting a restoring force on the element dependent upon the displacement of the mounting, an electromagnetic drive system coupled to said mounting for operating on said element to apply it against an object to be measured, said electromagnetic drive system comprising means for generating an adjustable force, a measurement transducer on said support means in operative association with the mounting for producing an output dependent upon the displacement of the mounting, electronic control means connected to said drive system, and means directing said output to said control means, said control means acting in response to said transducer output on said drive system to cause the drive system to apply a mechanical force holding the sensor element against the object to be measured while controlling said force to compensate for said mounting restoring force and maintaining the pressure of application of the sensor element upon said object substantially independent of the displacement of the mounting.

9. A device according to claim 8 wherein said means directing the output of said transducer includes a measurement transducer electronic unit connecting the measurement transducer to said control means, said electronic unit includes means for generating a direct current signal for said control means, and the electromagnetic drive system comprises a permanent magnet direct current motor controlled by said control means.

10. A device according to claim 8 wherein electronic control means comprises a first adjustable potentiometer for modifying the force exerted by said electromagnetic drive system to compensate for gravity effects acting on the mounting, and a second adjustable potentiometer for adjusting the pressure of the sensor element on the object to be measured.

11. A device for length or position measurements comprising a sensor element, a mounting for said element, an electric motor coupled to said mounting for operation on said element to control the bearing pressure of said sensor element on an object to be measured, said electric motor serving for maintaining continuous contact with the object after contact has been established, control means acting on said motor for causing the motor to develop a force that is operative on the sensor for said pressure control, said mounting comprising means that exert a restoring force on said sensor element in dependence upon its displacement position and said control means comprising an electronic control circuit for varying the force developed by the motor also in dependence on the magnitude of the deflection, whereby to make said bearing pressure substantially independent of said displacement position.

* * * * *